United States Patent [19]

Taniguchi et al.

[11] Patent Number: 5,059,671
[45] Date of Patent: Oct. 22, 1991

[54] MANUFACTURING PROCESS OF SPRAY URETHANE ELASTOMER

[75] Inventors: Kazuo Taniguchi, Kamakura; Kazuhiro Imaoka, Yokohama; Tetsuyoshi Ogura, Zushi; Hiroaki Sakaguchi, Yokohama, all of Japan

[73] Assignee: Mitsui Toatsu Chemicals, Inc., Tokyo, Japan

[21] Appl. No.: 454,274

[22] Filed: Dec. 21, 1989

[30] Foreign Application Priority Data

Dec. 28, 1988 [JP] Japan .................. 63-328944

[51] Int. Cl.$^5$ ............................................. C08G 18/14
[52] U.S. Cl. ........................................ 528/49; 528/50; 528/64; 528/75; 521/99; 521/107
[58] Field of Search ............. 528/64, 61, 55, 48, 528/59, 49, 50, 75; 521/137, 99, 107

[56] References Cited

U.S. PATENT DOCUMENTS

| | | | |
|---|---|---|---|
| 4,018,724 | 4/1977 | Cobbledick | 521/137 |
| 4,584,325 | 4/1986 | Smith | 528/50 |
| 4,616,043 | 10/1986 | Smith | 528/49 |
| 4,695,618 | 9/1987 | Mowrer | 528/61 |

*Primary Examiner*—Morton Foelak
*Assistant Examiner*—Dve Truong
*Attorney, Agent, or Firm*—Burns, Doane, Swecker & Mathis

[57] ABSTRACT

This invention relates to a process for manufacturing a spray urethane elastomer. More particularly it relates to a process for manufacturing a solventless, non-cellular spray urethane elastomer, which comprises spraying a partial prepolymer component having a high molar ratio of NCO/OH prepared from an organic polyisocyanate and from polytetramethylene ether glycol (PTMEG) having a molecular weight of 400 to 2000 and a resin component containing the PTMEG, a specified chain extender and an organobismuth compound catalyst onto a substrate by use of a two components high pressure spray machine.

According to the present invention, spraying only of the stock solutions by use of the two components high pressure spray machine accomplishes coating and the stock solutions are cured in one second to ten and several seconds after being sprayed without producing cells even when thick-coated. Therefore, the present invention makes it possible to effect wet-on-wet coating within a short period of time, resulting in making it possible to accomplish a coating having a predetermined thickness in a short period of time.

An elastomer, which has been coated, is excellent at modulus, tensile strength, elongation, tear strength, heat resistance, and the like, such as pipe, tank and the like, waterproof materials such as concrete for the roof and outside wall which need waterproofness, thick-coated protective coating for a thermal insulant such as rigid polyurethane foam, polystyrene foam, board or the like, seamless floor covering material, open mold molding by use of a mold made of metal or resin, and the like.

5 Claims, No Drawings

MANUFACTURING PROCESS OF SPRAY URETHANE ELASTOMER

BACKGROUND OF THE INVENTION

The present invention relates to a process for manufacturing a spray urethane elastomer. More particularly it relates to a process for manufacturing a solventless spray urethane elastomer prepared from a prepolymer component obtained by a specific formulation and a resin component by use of two components high pressure spray machine.

The conventional manufacturing processes for spraying urethane elastomers include, for example, a solvent dilution process (in Adiprene Bulletin by Du Pont de Nemours) which comprises dissolving a prepolymer having a terminal isocyanato group and a highly active aromatic amine curing agent such as diphenylmethanediamine and the like in a solvent separately, and coating by use of the conventional two components spray machine (pressure: about 70 Kg /cm$^2$); a process which comprises diluting, in a solvent, and mixing the above prepolymer and a low active aromatic amine curing agent such as 3,3'-dichloro-4,4'-diaminodiphenylmethane (MOCA) and the like, followed by spraying within a pot life by use of a high pressure one component spray machine (see Japanese Patent Application Laid Open No. 17430/74 by MITSUI TOATSU CHEMICALS, INC.); a process using a high boiling solvent to maintain it in a coated product; a process comprising reacting a partial prepolymer with a mixture of a high molecular weight polyol and a low molecular weight polyol (see Japanese Patent Application Laid-Open Nos. 134077/75 and 147329/75 by MITSUI TOATSU CHEMICALS, INC.); and the like.

The above process using the solvent raises environmental pollution problems due to the solvent, raises thermal energy loss problems due to forced heat curing in the case of thick-coating, and raises problems of developing a large amount of foam from the coated product in the case of thick-spraying at one time because of the need to evaporate the solvent from the coated product. The process which uses the high boiling solvent to prevent foams from developing and allows the solvent to remain in the coated product, raises such problems as the solvent is lost when the coated product is used over a long period of time due to migration, evaporation, elution into rainwater and the like, resulting in deterioration of the coating taking place along with cracking, shrinkage, etc.

A process, in which coating is carried out thinly and repeatedly, has such a drawback that it takes a long period of time to accomplish the coating.

A process, in which, for example, a carbodiimide modified liquid diphenylmethane diisocyanate (hereinafter diphenylmethane diisocyanate is referred to as MDI.) or a partial prepolymer of MDI is reacted with a mixture of a high molecular weight polyol and a low molecular weight polyol to prepare a coated product, has such a drawback that the low molecular weight polyol is so highly hydroscopic as to result in a competitive reaction between the hydroxyl group and moisture, in being easily foamed, in developing pinholes, craters and the like on the coated product, and in reducing the specific gravity and strength of the coated product.

The above processes all have such drawbacks as reduction in density of the coated product, and consequently a deterioration in physical properties, deterioration in surface properties, etc., because foaming due to moisture in the air and foaming due to moisture caused by hydroscopicity of the polyol component, etc. are not completely controlled.

The conventional processes for manufacturing urethane elastomer include such ones as cast molding, millable polyurethane process, thermoplastic molding, etc. It was very difficult for the above processes to apply to a lining in order to impart abrasion resistance, etc. to a surface having a complicated configuration.

DETAILED DESCRIPTION OF THE INVENTION

The present inventors conducted intensive research on a process for manufacturing a spray urethane elastomer which is capable of being thick-coated and is free of the influence of moisture, resulting in accomplishing the present invention by selecting a specified catalyst.

The molding process by spraying in the present invention makes possible moldings and applications which have been considered impossible.

The process of the present invention is capable of being applied to a vertical surface because of a high initial curing speed, completely preventing cracks from developing by preventing cheese-like jellification which initially takes place, and obtaining a molded product having satisfactory physical properties. That is, a specifically excellent starting material system has been found, comprising a combination of a polytetramethylene ether glycol based polyether, a highly active aromatic polyamine and an organobismuth catalyst capable of providing an elastomer having excellent physical properties, particularly high abrasion resistance.

The reaction rate of the starting material system in the present invention is so high that the conventional stirring machine is unusable and a special spray machine is needed. It is an essential requirement that a two components high pressure spray machine is used, that respective hydraulic pressures are raised up to about 100 Kg/cm$^2$, followed by mixing with a colliding and mixing gun, and immediately followed by spraying. The present invention is accomplished by subjecting the above system to molding by use of the above spray machine.

That is, the present invention provides a process for manufacturing a solventless spray urethane elastomer which comprises spraying directly onto a substrate by use of a two components high pressure spray machine, in a NCO/OH molar ratio of about 0.9 to 1.3 of certain components (a) and (b): (a) a partial prepolymer component prepared by reacting an organic polyisocyanate and a polytetramethylene ether glycol having a molecular weight of 400 to 2,000 at a NCO/OH molar ratio of 5 to 40, and (b) a resin component prepared by mixing a polytetramethylene ether glycol, having a molecular weight of 400 to about 2000, an active aromatic polyamine as a chain extender and free of an electron attractive group on the aromatic nucleus and an organobismuth compound as a catalyst by use of a two components high pressure spray machine.

Examples of the organic polyisocyanate used in the present invention include 2,4-tolylene diisocyanate (hereinafter referred to as 2,4-TDI), 2,6-TDI and a mixture of 2,4-TDI and 2,6-TDI, 2,4'-MDI, 4,4'-MDI and a mixture of 2,4'-MDI and 4,4'-MDI, xylene diisocyanate (XDI), 2,4-and/ or 4,4'-dicyclohexylmethane diisocyanate (hydrogenated MDI), isophorone diisocyanate (IPDI), hexamethylene diisocyanate (HDI), hydrogenated xylene diisocyanate (HXDI), crude TDI, polymethylene polyphenyl polyisocyanate (crude MDI, polymeric MDI), isocyanurate-modified ones, carbodiimide modified ones, biuret modified ones and urethoneimine modified ones of the above isocyanates respectively, and the like. Of the above organic polyisocyanates, MDI, crude MDI and their modified ones are particularly preferred.

The polytetramethylene ether glycol (hereinafter referred to as simply PTMEG) having a molecular weight of 400 to 2,000 used in the present invention is a diol obtained by the ring opening polymerization of tetrahydrofuran and is represented by the following general formula:

The organic polyisocyanate is mixed with the above polytetramethylene ether diol at a NCO/OH molar ratio of 5 to 40 and is reacted at about 80° C. for about 3 hours to obtain a partial prepolymer having NCO group at the molecular terminal.

Examples of the active aromatic polyamine used as the chain extender and free of the electron attractive group on the aromatic nucleus in the present invention include 4,4'-diaminodiphenyl, 4,4'-diaminodiphenyl ether, 2,3-, 3,4- , 2,4- and 2,6- diaminotoluene or mixtures thereof at various weight ratios, 2,4- and/or 4,4'-diaminodiphenylmethane, 3,3'-diethyl-4,4'-diaminodiphenylmethane, 1,3- and 1,4-phenylenediamine, naphthylene-1,5-diamine, polymethylene polyphenyl polyamine liquid polymer obtained by aniline-formaldehyde condensation, 1,3-dimethyl-2,4-diaminobenzene, 1,3-diethyl-2,4-diaminobenzene, 1,3-dimethyl-2,6-diaminobenzene, 1,4-diethyl-2,5-diaminobenzene, 1-methyl-3,5-diethyl-2,4-diaminobenzene (a), 1-methyl-3,5-diethyl-2,6-diaminobenzene (b), a mixture of (a) and (b) (hereinafter referred to as DETDA), 1,4-diisopropyl-2,5-diaminobenzene, 1,4-dibutyl-2,5-diaminobenzene, 2,4-diaminomesitylene, 1,3,5-triethyl-2,4-diaminobenzene, 1,3,5-triethyl-2,6-diaminobenzene, 1,3,5-triisopropyl-2,4-diaminobenzene and similar compounds; 2,3-dimethyl -1,4-diaminonaphthalene, 2,6-dimethyl-1,5-diaminonaphthalene, 2,6-diisopropyl-1,5-diaminonaphthalene, 2,6-dibutyl-1,5-diaminonaphthalene and similar compounds; 3,3',5,5'-tetramethyl benzidine, 3,3',5,5'-tetra isopropyl benzidine and similar compounds; 3,3',5,5'-tetramethyl-4,4'-diaminodiphenylmethane, 3,3',5,5'- tetraethyl-4,4'-diaminodiphenylmethane, 3,3',5,5'-tetraisopropyl-4,4'-diaminodiphenylmethane, 3,3',5,5'-tetrabutyl-4,4'-diaminodiphenylmethane, 3,5-diethyl-3'-methyl-2',4-diaminodiphenylmethane, 3,5-diisopropyl-3'-methyl-2',4-diaminodiphenylmethane, 3,3'-diethyl-2,2'-diaminodiphenylmethane, 3,3'-diethyl-4,4'-diaminodiphenylmethane and similar compounds; 3,3',5,5'-tetraethyl- 4,4'-diaminodiphenyl ether, 3,3',5,5'-tetraisopropyl-4,4'-diaminodiphenyl ether, and the like. The above aromatic polyamines are used alone or in combination and in an amount of preferably 19 to 160 parts ("parts" means "parts by weight" in the present invention) per 100 parts of polyol in the resin component. In other words, DETDA is 15 to 62% by weight based on the resin component.

The catalyst used in the present invention is a mixture containing an organobismuth compound as an effective ingredient and is prepared by reacting an organic carboxylic acid with a bismuth salt. Bismuth trineodecanoate (Trademark: COSCAT #83 by COSAN CHEMICAL CO., LTD.) is particularly preferred. This compound is represented by the following structural formula:

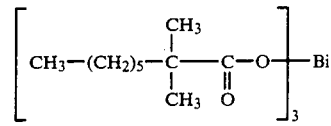

with about 57% purity.

A partial prepolymer having a high NCO % and a high NCO/OH molar ratio is so highly active as to have high reactivity with water and to be easily able to foam. However, the use of the above catalyst not only promotes the reaction between isocyanato group and OH group, but also controls the reaction with moisture in the resin and air, resulting in that chain extending takes place at an early stage and the initial cheese-like appearance is not observed to exhibit rubber elasticity. As the result, the elastomer thus obtained has a high density. Moreover, the above catalyst is not decomposed at raised temperatures and has good heat resistance.

The catalyst is used in a amount of 0.2 to 2.0% by weight based on the resin component.

The two components hi9h pressure colliding and mixing spray machine is of such a type that the partial prepolymer component collides with the resin component under high pressure at a blow-off nozzle to be thoroughly mixed with each other and to be dashed and coated onto the application surface, for example, preferably including RIM Series, MODEL T-3 by GLASCRAFT,INC., MODEL- H-II by GUSMER Corp. and the like. These two components high pressure sprayers are such that the stock solutions are sprayed onto the application surface under a blow-off pressure of 60 to 150 Kg/cm$^2$ and a mixture of the stock solutions forms fine particles, resulting in making it possible to obtain an even application surface and to obtain a fairly thick coating by one spraying.

Examples of the low molecular weight glycol preferably used in order to control reactivity on the reaction for the preparation of the partial prepolymer in the present invention include dipropylene glycol, tripropylene glycol, tetrapropylene glycol, diethylene glycol, 1,3- and 2,3-butanediol, neopentylglycol and the like.

The above low molecular weight glycols are used alone or in combination, and in an amount of 1 to 20% by weight based on polytetramethylene ether glycol with the result that the NCO/OH molar ratio between a mixture thereof with polytetramethylene ether glycol and the organic polyisocyanate is in the range of from 5 to 40.

Partial prepolymer is made by a process, for example, as indicated in Rubber Age November, pp 46~47 (1973).

And, if necessary, other plasticizers flame retardants mixed with the partial propolymer component are as follows.

Examples of the above plasticizer include dioctyl phthalate (DOP), dibutyl phthalate (DBP), dioctyl adipate (DOA), tricresyl phosphate (TCP), chlorinated paraffin, and the like. The plasticizer is used in an amount of 2 to 20% by weight, preferably 5 to 10% by weight based on the partial prepolymer.

Examples of the flame-retardant include phosphoric acid esters such as tris-β-chloropropyl phosphate (FYROL PCF by AKZO JAPAN, Ltd.), tris-dichloropropyl phosphate (CRP marketed by DAIHACHI CHEMICALS, Co., Ltd.), tris-chloroethyl phosphate (CLP marketed by DAIHACHI CHEMICALS, Co., Ltd.); and the like.

The above flame-retardant is used in an amount of 2 to 30% by weight, preferably 5 to 15% by weight based on the partial prepolymer component.

In the present invention, stabilizers, and if necessary organic or inorganic pigments or fillers are also used.

Examples of the stabilizer include positionally hindered phenols such as IRGANOX 1010 and 1076, trademark, marketed by CIBA GEIGY Co., Ltd., YOSHINOX BHT, BB and GSY-930, marketed by YOSHITOMI SEIYAKU Co., Ltd., and the like; bezotriazols such as TINUVIN P, 327 and 328, marketed by CIBA GEIGY Co., Ltd.; benzophenones such as TOMISOAP 800, marketed by YOSHITOMI SEIYAKU Co., Ltd., positionally hindered amines such as SANOL LS 770 and 744,TINUVIN 144, marketed by CIBA GEIGY Co., Ltd.; and the like.

The stabilizer is used in an amount of 0.3 to 2% by weight based on the resin component.

Examples of the above filler include glass fiber, carbon black, calcium carbonate, talc, kaolin, zeolite, diatomaceous earth, pearlite, vermiculite, titanium dioxide and the like.

The filler is used in an amount of 5 to 10% by weight based on the resin component.

A polytetramethylene ether glycol is used in an amount of 38 to 85% by weight, and an active aromatic polyamine as a chain extender is used in an amount of 15 to 62% by weight based on resin component.

In the practice of the present invention, the partial prepolymer is taken as a component A, as it is or by preferably mixing therewith a proper amount of flame-retardant and plasticizer in order to control a flow rate volumetric ratio between two components. On the other hand, a component B is formed by mixing polyol, the chain extender, the catalyst, the pigment and the like. The components A and B are blown off at a predetermined flow rate ratio from the two components high pressure spray machine to be sprayed onto the application surface in a molar ratio (NCO/OH) of about 0.9 to 1.3, the spraying condition has desirably a temperature (usually 50° to 60° C.) wherein the viscosity of liquids (A) and (B) is desired to be under 200 cps, and the difference of pressure between both liquids to be normally under 14Kg/cm$^2$. In the case where the glass fiber is used as the filler, air is blown off as a chopped strand glass fibers cut to length at a position of the head of a gun so that the glass fiber is mixed with both components while flying in the air. A mixture of the components A and B, which has been applied onto a coated product, is cured within one to 10 seconds. As desired, the above procedure is repeated several times to obtain a coated product having a predetermined film thickness.

The spray urethane elastomer according to the present invention is used in lining or protective coating for iron structures such as pipe, tank and the like, waterproof materials such as concrete for the roof and outside walls which need waterproofness, thick-coated protective coating for a thermal insulant such as rigid polyurethane foam, polystyrene foam, board or the like, seamless floor covering material, open mold molding by use of a mold made of metal or resin, and the like.

According to the present invention, spraying only of the stock solutions by use of the two components high pressure spray machine accomplishes coating and the stock solutions are cured in one second to ten and several seconds after being sprayed without producing cells even when thick-coated. Therefore, the present invention makes it possible to effect wet-on-wet coating within a short period of time, resulting in making it possible to accomplish a coating having a predetermined thickness in a short period of time.

The present invention also makes it possible to accurately reproduce complicated configurations such as an uneven design on the surface of an object to be coated by a simple operation on the surface of the object to be coated, because no cells are formed.

EXAMPLE

The present invention is explained more in detail by the following Examples.

The formulations in the following Examples and Comparative Examples are represented by g(gram).

(A) Preparation of partial prepolymer component (Isocyanate component)

To a mixture of purified MDI (MDI-PH, marketed by MITSUI TOATSU CHEMICALS. INC.) and liquid MDI (MDI-LK, marketed by MITSUI TOATSU CHEMICALS, INC.) further including MDI(mixed) in Example 2 and MDI(mixed) only in Comparative Example 2, is added PTMEG, PPG or polyester polyol as shown in Table 1 to be reacted at 80° C. for 3 hours in a nitrogen atmosphere, followed by adding assistants such as flame-retardant and the like to obtain a partial prepolymer component (isocyanate component).

(B) Preparation of resin component

The resin component is prepared by uniformly mixing the aforementioned PTMEG, PPG or polyester polyol, the aforementioned DETDA or 1,4-butanediol, the aforementioned COSCAT #83, toner, stabilizer and the like according to the formulations shown in Table 1.

EXAMPLES 1-3

The formulations are as shown in Table 1.

The partial prepolymer component (solution A) and the resin component (solution B) are sprayed at a volumetric ratio of 1:1 to 1:2 by use of the following machine. The solutions are sent to a two components high pressure spray machine by a GRACO's supply pump (air-driven 2:1, 208-177 type) under an air pressure of 5 Kg/cm$^2$.

The spray machine used is a RIM Series marketed by GLAS-CRAFT INC., and is used under a pressure of about 140 Kg/cm$^2$ when stopped, and 105 to 119 Kg/cm$^2$ when sprayed. Temperature control of the solutions is carried out in such a manner that the heat exchanger in the body is set at 50° C. for solution A and 60° C. for solution B, and the electric current of the hose heater is 4 amperes. A flat chamber (No. 1) and tip (043-25) are mounted on a Probler gun marketed by GLAS-CTAFT, INC. to be used as a spray gun. Spraying is carried out 3 to 5 times by use of a 1 mm thick polypropylene sheet as a mold to obtain a sheet having a thickness of about 2 mm. Temperature and relative humidity under the spray conditions are as shown in Table 1.

The sheet thus obtained is cultured for 7 days in a thermostatic chamber at 23° C., followed by being subjected to physical properties measurements according to JIS K-6301.

The physical properties of the sheet thus obtained are as shown in Table 2. The results of heat resistance test for the sheet obtained in Example 2 are as shown in Table 3.

TABLE 1

| | Formulation (g) | | | | | | | | |
|---|---|---|---|---|---|---|---|---|---|
| | Example 1 | Comp. Ex. 1 | Example 2 | Comp. Ex. 2 | Example 3 | Comp. Ex. 3 | Comp. Ex. 4 | Comp. Ex. 5 | Comp. Ex. 6 |
| (A) Partial prepolymer (Isocyanate) | | | | | | | | | |
| MDI-PH | 777 | ← | 287 | ← | 1,190 | ← | 775 | 667 | 687 |
| MDI-LK | 333 | ← | 143.5 | ← | 793 | ← | 333 | 333 | 172 |
| MDI (Mixture) | — | — | 287 | 287 | — | — | — | — | — |
| PTMEG-1,000 | 500 | 500 | — | — | 384 | 384 | 500 | — | — |
| PTMEG-650 | — | — | 324.3 | ← | — | — | — | — | — |
| DPG | — | — | — | — | 15.5 | ← | — | — | — |
| PPG-Diol-3000 (OHV:37) | | | | | | | | 570 | — |
| EA-2000 (OHV:56.1) | | | | | | | | — | 250 |
| FYROL ®-PCF (flame-retardant) (AKZO JAPAN) | — | — | 52.1 | 52.1 | — | — | — | — | — |
| NCO (% by weight) | 19 | 19 | 17 | ← | 24 | ← | 19 | 19 | 24 |
| NCO/OH (mol ratio) | 8.4 | 8.4 | 5.6 | 5.6 | 15 | ← | 8.4 | 20 | 26.5 |
| Viscosity (CPS/25° C.) | 700 | 700 | 1,000 | 1,000 | 400 | 400 | 700 | 350 | 600 |
| Sp. Gravity | 1.1 | 1.1 | 1.1 | 1.1 | 1.15 | 1.15 | 1.1 | 1.18 | 1.21 |
| (B) Resin | | | | | | | | | |
| PTMEG-1,000 | 66.6 | ← | — | — | — | — | 66.6 | — | — |
| PTMEG-1,500 | — | — | — | — | 75.8 | ← | — | — | — |
| PTMEG-650 | — | — | 79.2 | ← | — | — | — | — | — |
| DETDA | 28.4 | ← | 15.3 | ← | 18.7 | ← | 28.4 | — | — |
| PPG-Diol-2000 (OHV:56) | | | | | | | | 73.2 | — |
| EA-2000 (OHV):56.1 | | | | | | | | — | 67.5 |
| 1,4-BD | | | | | | | | 21.8 | 21.5 |
| TINUVIN ® #327 (Stabilizer) | | | | | | | | 0.5 | — |
| DOP | | | | | | | | — | 6.0 |
| DBTDL (Catalyst) | — | 1.0 | — | 1.0 | — | 1.0 | (Pb-Naphthenate (24%) 1.0 | | |
| COSCAT ® #83 (Catalyst) | 0.5 | — | 0.5 | — | 0.5 | — | — | 0.5 | 0.5 |
| Toner | 4.5 | 4.0 | 5.0 | 4.5 | 5.0 | 4.5 | 4.0 | 4.0 | 4.0 |
| IRGANOX ® 1010 (Stabilizer) (CIBA GEIGY CO.) | 0.5 | ← | 0.5 | ← | 0.5 | ← | 0.5 | — | 0.5 |
| NCO INDEX:[NCO/OH (molar ratio)] (in curing) | 1.1 | ← | 1.05 | ← | 1.05 | ← | 1.1 | 1.1 | 1.1 |
| Formulation Ratio voluum (A)/(B) in molding | 1/1 | ← | 1/1 | ← | 1/2 | ← | 1/1 | 1/1.5 | 1/2 |
| Temperature (°C.) | 6.3 | ← | 27.8 | ← | 23 | ← | 6.3 | ← | 23 |
| Relative humidity (RH) (%) | 30 | ← | 68 | ← | 55 | ← | 30 | ← | 55 |
| Moldability | | | | | | | | Reaction is late, liquid hangs down when applied on vertical surface | ← |
| Curability | | | | | | | | When curing, it develops into a shape like weakly coagulated cheese, it takes time to produce physical properties | ← |

Note:
EA-2000 Polyesterpolyol of Ethylene glycol and Adipic acid
1,4-BD 1,4-Butanediol
OHV Hydroxyl value
MDI-PH Pure MDI (4,4'-isomer: over 98%)
MDI-LK Liquid MDI, Carbodiimide modified
MDI (mixture) 4,4'-isomer + 2,4'-isomer (60/40% by weight)
PTMEG-1,500 Polytetramethylene ether glycol, Mol. Weight: ca. 1,500
PTMEG-1,000 Polytetramethylene ether glycol, Mol. Weight: ca. 1,000
PTMEG-650 Polytetramethylene ether glycol, Mol. Weight: ca. 650
DPG Dipropyleneglycol
DETDA Mixture of 1-methyl-3,5-diethyl-2,4-diamino benzene and 1-methyl-3,5-diethyl-2,6-diaminobenzene (chain exdender)
DBTDL Dibutyl tin dilaurate (catalyst)
Toner Mixed and kneaded material of inorganic and/or organic pigment and plasticizer

TABLE 2

| | Physical property (thickness: ca. 2 mm) | | | | | | | | |
|---|---|---|---|---|---|---|---|---|---|
| | Example 1 | Comp. Ex. 1 | Example 2 | Comp. Ex. 2 | Example 3 | Comp. Ex. 3 | Comp. Ex. 4 | Comp. Ex. 5 | Comp. Ex. 6 |
| Density (g/cm³) | 0.99 | 0.86 | 0.98 | 0.80 | 0.99 | 0.76 | Molded sheet develops into a shape like weakly coagulated cheese, disabling it to measure physical properties. | 0.84 | 0.73 |
| Hardness | 59D | 51D | 97A | 91A | 93A | 86A | | 85A | 82A |
| $M_{100}$ (Kg f/cm²) | 146 | 118 | 130 | 83 | 92 | 63 | | 65 | 58 |
| Tensile strength (Kg f/cm²) | 240 | 154 | 250 | 160 | 230 | 145 | | 95 | 80 |
| Elongation (%) | 260 | 170 | 290 | 200 | 340 | 270 | | 380 | 240 |
| Tear strength (Kg f/cm²) | 85 | 70 | 77 | 64 | 69 | 53 | | 45 | 42 |

Note:
Hardness (D: Shore-D, A: Shore-A)
$M_{100}$ 100% tensile modulus

TABLE 3

| Heat resistance test (Maintenance of physical property %) | | | | | |
|---|---|---|---|---|---|
| | Hardness | $M_{100}$ | Tensile strength | Elongation | Tear strength |
| (1) COSCAT #83 Catalyst (Sheet of Example 2) | | | | | |
| Blank test | 100 | 100 | 100 | 100 | 100 |
| after 70° C. × 7 days | 100 | 106 | 109 | 100 | 100 |
| after 100° C. × 7 days | 101 | 99 | 109 | 115 | 104 |
| after 120° C. × 7 days | 98 | 88 | 109 | 138 | 117 |
| (2) DBTDL Catalyst (Sheet of Comparative Example 2) | | | | | |
| Blank test | 100 | 100 | 100 | 100 | 100 |
| after 70° C. × 7 days | 112 | 103 | 112 | 123 | 104 |
| after 100° C. × 7 days | 104 | 80 | 54 | 100 | 81 |
| after 120° C. × 7 days | 83 | — | 31 | 9 | 38 |

COMPARATIVE EXAMPLES 1-6

Physical properties of the sheets obtained by spraying solution (A) and solution (B) according to the formulations in Table 1 respectively under the same conditions as in Examples 1-3 by use of the same two components high pressure spray machine as in Examples 1-3, are as shown in Table 2. The results of heat resistance test for the sheet obtained in Comparative Example 2 are as shown in Table 3.

As shown in Table 1 to Table 3, the sheets obtained by use of COSCAT #83 catalyst according to the present invention have better physical properties, i.e. modulus, tensile strength, elongation and tear strength compared with those obtained by use of DBTDL catalyst.

The results of the heat resistance test show that the sheets obtained by use of COSCAT #83 catalyst have better physical properties compared with those obtained by use of DBTDL catalyst in all of the above physical properties.

Even if COSCAT #83 is used, the use of low molecular weight glycol as the chain extender results in reducing the reaction rate to be unapplicable to the spray molding according to the present invention, in showing cheese-like appearance on curing and such undesirable appearance as to cause cracks etc.

What is claimed is:

1. A process for manufacturing a solventless spray urethane elastomer which comprises spraying components (a) and (b) directly onto a substrate, using a two component high pressure spray machine equiped with a colliding and mixing type spray gun; components (a) and (b) comprising: (a) a partial prepolymer component prepared by reacting an organic polyisocyanate and a polytetramethylene ether glycol having a molecular weight of 400 to 2,000 at a NCO/OH molar ratio of 5 to 40; and (b) a resin component prepared by mixing (i) a polytetramethylene ether glycol, having a molecular weight of 400 to about 2000, (II) an active aromatic polyamine chain extender free of electron attractive groups on the aromatic nucleus, and (III) an organobismuth catalyst.

2. A process according to claim 1, wherein said polyisocyanate is a purified or crude diphenylmethane diisocyanate, or modified diphenylmethane diisocyanate.

3. A process according to claim 1, wherein said chain extender is a sterically hindered aromatic polyamine substituted by at least one alkyl group having from 1 to 5 carbon atoms.

4. A process according to claim 1, wherein said organobismuth compound is bismuth trineodecanoate.

5. A process according to claim 1, wherein a low molecular weight glycol is mixed therewith in the reaction for the preparation of the partial prepolymer.

* * * * *